US007760248B2

(12) United States Patent
Marks et al.

(10) Patent No.: US 7,760,248 B2
(45) Date of Patent: Jul. 20, 2010

(54) SELECTIVE SOUND SOURCE LISTENING IN CONJUNCTION WITH COMPUTER INTERACTIVE PROCESSING

(75) Inventors: Richard L. Marks, Foster City, CA (US); Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 350 days.

(21) Appl. No.: 11/429,133

(22) Filed: May 4, 2006

(65) Prior Publication Data

US 2006/0204012 A1    Sep. 14, 2006

Related U.S. Application Data

(63) Continuation-in-part of application No. 11/301,673, filed on Dec. 12, 2005, and a continuation-in-part of application No. 10/820,469, filed on Apr. 7, 2004, and a continuation-in-part of application No. 10/759,782, filed on Jan. 16, 2004, now Pat. No. 7,623,115, and a continuation-in-part of application No. 10/663,236, filed on Sep. 15, 2003, and a continuation-in-part of application No. 10/650,409, filed on Aug. 27, 2003, now Pat. No. 7,613,310, and a continuation-in-part of application No. 10/207,677, filed on Jul. 27, 2002, now Pat. No. 7,102,615.

(60) Provisional application No. 60/718,145, filed on Sep. 15, 2005, provisional application No. 60/678,413, filed on May 5, 2005.

(51) Int. Cl.
*H04N 5/76* (2006.01)
*H04N 7/14* (2006.01)
*H04N 9/475* (2006.01)
*H04R 5/00* (2006.01)
*H04R 3/00* (2006.01)

(52) U.S. Cl. .............. 348/231.4; 348/14.09; 348/515; 381/26; 381/92

(58) Field of Classification Search ............... 381/26, 381/92, 356, 357, 111–115, 95, 122, 91; 348/231.4, 515, 632, 736, 738, 14.09

See application file for complete search history.

(56) References Cited

U.S. PATENT DOCUMENTS

| | | | |
|---|---|---|---|
| 3,943,277 A | 3/1976 | Everly et al. | 348/19 |
| 4,263,504 A | 4/1981 | Thomas | 235/454 |
| 4,313,227 A | 1/1982 | Eder | 398/106 |
| 4,558,864 A | 12/1985 | Medwedeff | 273/148 B |
| 4,565,999 A | 1/1986 | King et al. | 345/158 |
| 4,802,227 A * | 1/1989 | Elko et al. | 381/92 |
| 4,823,001 A | 4/1989 | Kobayashi et al. | 356/616 |
| 4,843,568 A | 6/1989 | Krueger et al. | 382/100 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |
| 5,335,011 A | 8/1994 | Addeo et al. | 348/15 |
| 5,426,450 A | 6/1995 | Drumm | 345/168 |
| 5,455,685 A | 10/1995 | Mori | 348/363 |
| 5,517,333 A | 5/1996 | Tamura et al. | 358/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |

| Patent No. | Date | Inventor | Class |
|---|---|---|---|
| 5,850,222 A | 12/1998 | Cone | 345/418 |
| 5,850,473 A | 12/1998 | Andersson | 382/165 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,963,250 A | 10/1999 | Parker et al. | 348/211.6 |
| 5,993,314 A | 11/1999 | Dannenberg et al. | 461/1 |
| 6,009,210 A * | 12/1999 | Kang | 382/276 |
| 6,014,167 A | 1/2000 | Suito et al. | 348/169 |
| 6,021,219 A | 2/2000 | Andersson et al. | 382/190 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,091,905 A | 7/2000 | Yahav et al. | 396/106 |
| 6,097,369 A | 8/2000 | Wambach | 345/158 |
| 6,100,517 A | 8/2000 | Yahav et al. | 250/208.1 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,151,009 A | 11/2000 | Kanade et al. | 345/113 |
| 6,160,540 A | 12/2000 | Fishkin et al. | 345/184 |
| 6,173,059 B1 | 1/2001 | Huang et al. | 381/92 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,297,838 B1 | 10/2001 | Chang et al. | 715/863 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,513,160 B2 | 1/2003 | Dureau | 725/9 |
| 6,542,927 B2 | 4/2003 | Rhoads | 709/217 |
| 6,545,706 B1 | 4/2003 | Edwards et al. | 348/169 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 * | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/32 |
| 6,677,967 B2 | 1/2004 | Swano et al. | 715/839 |
| 6,677,987 B1 | 1/2004 | Girod | 348/171 |
| 6,709,108 B2 | 3/2004 | Levine et al. | 351/211 |
| 6,720,949 B1 * | 4/2004 | Pryor et al. | 345/158 |
| 6,751,338 B1 | 6/2004 | Wallack | 382/106 |
| 6,753,849 B1 | 6/2004 | Curran et al. | 345/158 |
| 6,769,769 B2 | 8/2004 | Podlleanu et al. | 351/221 |
| 6,772,057 B2 | 8/2004 | Breed et al. | 704/45 |
| 6,774,939 B1 * | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,795,068 B1 | 9/2004 | Marks | 345/419 |
| 6,809,776 B1 | 10/2004 | Simpson | 348/565 |
| 6,819,318 B1 | 11/2004 | Geng | 345/420 |
| 6,847,311 B2 | 1/2005 | Li | 341/28 |
| 6,881,147 B2 | 4/2005 | Naghi et al. | 463/35 |
| 6,919,824 B2 | 7/2005 | Lee | 341/20 |
| 6,924,787 B2 | 8/2005 | Kramer et al. | 345/156 |
| 6,931,125 B2 | 8/2005 | Smallwood | 379/433.07 |
| 6,943,776 B2 | 9/2005 | Ehrenburg | 345/168 |
| 6,947,576 B2 | 9/2005 | Stam et al. | 382/104 |
| 6,951,515 B2 | 10/2005 | Ohshima et al. | 463/31 |
| 6,952,198 B2 | 10/2005 | Hansen | 345/158 |
| 6,970,183 B1 | 11/2005 | Monroe | 348/143 |
| 7,016,411 B2 | 3/2006 | Azuma et al. | 375/240.08 |
| 7,039,253 B2 | 5/2006 | Matsuoka et al. | 382/295 |
| 7,042,440 B2 | 5/2006 | Pryor et al. | 345/158 |
| 7,059,962 B2 | 6/2006 | Watashiba | 463/2 |
| 7,061,507 B1 | 6/2006 | Tuomi et al. | 345/611 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,139,767 B1 | 11/2006 | Taylor et al. | 707/102 |
| 7,148,922 B2 | 12/2006 | Shimada | 348/370 |
| 7,161,634 B2 | 1/2007 | Long | 384/624 |
| 7,164,413 B2 | 1/2007 | Davis et al. | 345/163 |
| 7,183,929 B1 | 2/2007 | Antebi et al. | 340/573.1 |
| 7,206,418 B2 * | 4/2007 | Yang et al. | 381/92 |
| 7,212,308 B2 | 5/2007 | Morgan | 358/1.18 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,274,305 B1 | 9/2007 | Lutrell | 340/870.02 |
| 7,283,679 B2 | 10/2007 | Okada et al. | 382/260 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,364,297 B2 | 4/2008 | Goldfain et al. | 351/206 |
| 7,379,559 B2 | 5/2008 | Wallace et al. | 382/100 |
| 7,446,650 B2 | 11/2008 | Schofield et al. | 340/425.5 |
| 2001/0056477 A1 | 12/2001 | McTernan et al. | 709/219 |
| 2002/0021811 A1 * | 2/2002 | Kubota | 381/17 |
| 2002/0048376 A1 * | 4/2002 | Ukita | 381/92 |
| 2002/0085097 A1 | 7/2002 | Colmenarez et al. | 348/211 |
| 2002/0134151 A1 | 9/2002 | Naruoka et al. | 73/291 |
| 2002/0158873 A1 | 10/2002 | Williamson | 345/427 |
| 2003/0093591 A1 | 5/2003 | Hohl | 710/22 |
| 2003/0100363 A1 | 5/2003 | Ali | 436/30 |
| 2003/0123705 A1 | 7/2003 | Stam et al. | 382/104 |
| 2003/0160862 A1 | 8/2003 | Charlier et al. | 348/14.08 |
| 2004/0001082 A1 | 1/2004 | Said | 345/730 |
| 2004/0017355 A1 | 1/2004 | Shim | 345/157 |
| 2004/0037436 A1 * | 2/2004 | Rui | 381/92 |
| 2004/0046736 A1 | 3/2004 | Pryor et al. | 345/156 |
| 2004/0047464 A1 | 3/2004 | Yu et al. | 379/392.01 |

| | | | | |
|---|---|---|---|---|
| 2004/0063480 | A1 | 4/2004 | Wang | 463/8 |
| 2004/0063481 | A1 | 4/2004 | Wang | 463/8 |
| 2004/0070565 | A1 | 4/2004 | Nayar et al. | 345/156 |
| 2004/0087366 | A1 | 5/2004 | Shum et al. | 463/36 |
| 2004/0095327 | A1 | 5/2004 | Lo | 345/169 |
| 2004/0140955 | A1 | 7/2004 | Metz | 345/166 |
| 2004/0213419 | A1* | 10/2004 | Varma et al. | 381/92 |
| 2004/0254017 | A1 | 12/2004 | Cheng | 463/35 |
| 2005/0037844 | A1 | 2/2005 | Shum et al. | 463/36 |
| 2005/0047611 | A1 | 3/2005 | Mao | 381/94.7 |
| 2005/0105777 | A1 | 5/2005 | Koslowski et al. | 382/115 |
| 2005/0117045 | A1 | 6/2005 | Abdellatif et al. | 384/335 |
| 2006/0033713 | A1 | 2/2006 | Pryor | 345/158 |
| 2006/0035710 | A1 | 2/2006 | Festejo et al. | 463/36 |
| 2007/0066394 | A1 | 3/2007 | Ikeda et al. | 463/37 |
| 2007/0120834 | A1 | 5/2007 | Boillot | 354/103 |
| 2007/0120996 | A1 | 5/2007 | Boillot | 384/345 |
| 2008/0056561 | A1 | 3/2008 | Sawachi | 382/154 |
| 2008/0070684 | A1 | 3/2008 | Haigh-Hutchinson | 463/32 |
| 2009/0010494 | A1 | 1/2009 | Bechtel et al. | 382/104 |

FOREIGN PATENT DOCUMENTS

| | | |
|---|---|---|
| EP | 0353200 | 1/1990 |
| EP | 0 652 686 A1 | 5/1995 |
| EP | 0750202 | 12/1996 |
| EP | 1435258 | 7/2004 |
| EP | 1 489 586 A1 | 12/2004 |
| FR | 2814965 | 4/2002 |
| GB | 2206716 | 1/1989 |
| GB | 2206716 | 11/1989 |
| GB | 2376397 | 11/2002 |
| GB | 2388418 | 11/2003 |
| JP | 1284897 | 11/1989 |
| JP | 6102980 | 4/1994 |
| JP | 9128141 | 5/1997 |
| JP | 9185456 | 7/1997 |
| JP | 1138949 | 2/1999 |
| JP | 2000-172431 | 6/2000 |
| JP | 2001-166676 | 6/2001 |
| JP | 2004-145448 | 5/2004 |
| WO | WO 99/26198 | 10/1999 |
| WO | WO 02/27456 | 2/2002 |
| WO | WO 03/079179 | 9/2003 |
| WO | WO 2005/073838 | 8/2005 |

OTHER PUBLICATIONS

Wilson and Darrell, "*Audio-Video Array Source Localization for Intelligent Environments*", 2002, IEEE Dept. of Electrical Eng and Computer Science, Massachusetts Inst. of Technology, Cambridge, MA 02139.

Fiala et al., "*A Panoramic Video and Acoustic Beamforming Sensor for Videoconferencing*", 2004 IEEE, Computational Video Group, National Research Council, Ottawa, CA K1A 0R6.

"The Tracking Cube: A Three-Dimentional Input Device", IBM Technical Disclosure Bulletin, Aug. 1, 1989, pp. 91-95, No. 3B, IBM Corp.New York, U.S.

K. B. Shimoga, et al., "Touch and Force Reflection for Telepresence Surgery", Engineering in Medicine and Biology Opportunities of the Ieeee, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View", Sep. 9, 1991, Systems and Computers in Japan.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

\* cited by examiner

*Primary Examiner*—Lin Ye
*Assistant Examiner*—Mekonnen Dagnew
(74) *Attorney, Agent, or Firm*—Martine Penilla & Gencarella LLP (57) ABSTRACT

A method and apparatus for capturing image and sound during interactivity with a computer program is provided. The apparatus includes an image capture unit that is configured to capture one or more image frames. Also provided is a sound capture unit. The sound capture unit is configured to identify one or more sound sources. The sound capture unit generates data capable of being analyzed to determine a zone of focus, at which to process sound to the substantial exclusion of sounds outside of the zone of focus. In this manner, sound that is captured and processed for the zone of focus is used for interactivity with the computer program.

23 Claims, 6 Drawing Sheets

SELECTIVE SOUND SOURCE LISTENING IN CONJUNCTION WITH COMPUTER INTERACTIVE PROCESSING

CLAIM OF PRIORITY

This application claims benefit of U.S. Provisional Patent Application No. 60/678,413, entitled "SELECTIVE SOUND SOURCE LISTENING IN CONJUNCTION WITH COMPUTER INTERACTIVE PROCESSING", filed on May 5, 2005, and U.S. Provisional Patent Application 60/718,145, entitled "AUDIO, VIDEO, SIMULATION, AND USER INTERFACE PARADIGMS", filed Sep. 15, 2005, both of which are hereby incorporated by reference.

This application is a continuation in part (CIP) of U.S. patent application Ser. No. 10/207,677, entitled, "MAN-MACHINE INTERFACE USING A DEFORMABLE DEVICE", filed on Jul. 27, 2002 now U.S. Pat. No. 7,102,615; U.S. patent application Ser. No. 10/650,409, entitled, "AUDIO INPUT SYSTEM", filed on Aug. 27, 2003 now U.S. Pat. No. 7,613,310; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004 now U.S. Pat. No. 7,623,115; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005; all of which are hereby incorporated by reference.

RELATED APPLICATIONS

This application is related to commonly-assigned, co-pending application Ser. No. 11/381,729, to Xiao Dong Mao, entitled ULTRA SMALL MICROPHONE ARRAY, filed the same day as the present application, the entire disclosures of which are incorporated herein by reference. This application is also related to commonly-assigned, co-pending application Ser. No. 11/381,728, to Xiao Dong Mao, entitled ECHO AND NOISE CANCELLATION, filed the same day as the present application, the entire disclosures of which are incorporated herein by reference. This application is also related to commonly-assigned, co-pending application Ser. No. 11/381,725, to Xiao Dong Mao, entitled "METHODS AND APPARATUS FOR TARGETED SOUND DETECTION", filed the same day as the present application, the entire disclosures of which are incorporated herein by reference. This application is also related to commonly-assigned, co-pending application Ser. No. 11/381,727, to Xiao Dong Mao, entitled "NOISE REMOVAL FOR ELECTRONIC DEVICE WITH FAR FIELD MICROPHONE ON CONSOLE", filed the same day as the present application, the entire disclosures of which are incorporated herein by reference. This application is also related to commonly-assigned, co-pending application Ser. No. 11/381,724, to Xiao Dong Mao, entitled "METHODS AND APPARATUS FOR TARGETED SOUND DETECTION AND CHARACTERIZATION", filed the same day as the present application, the entire disclosures of which are incorporated herein by reference. This application is also related to commonly-assigned, co-pending application Ser. No. 11/381,721, to Xiao Dong Mao, entitled "SELECTIVE. SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending application Ser. No. 11/418,988, to Xiao Dong Mao, entitled "METHODS AND APPARATUSES FOR ADJUSTING A LISTENING AREA FOR CAPTURING SOUNDS", filed the same day as the present application, the entire disclosures of which are incorporated herein by reference. This application is also related to commonly-assigned, co-pending application Ser. No. 11/418,989, to Xiao Dong Mao, entitled "METHODS AND APPARATUSES FOR CAPTURING AN AUDIO SIGNAL BASED ON VISUAL IMAGE", filed the same day as the present application, the entire disclosures of which are incorporated herein by reference. This application is also related to commonly-assigned, co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as the present application, the entire disclosures of which are incorporated herein by reference. This application is also related to commonly-assigned, co-pending application Ser. No. 11/429,414, to Richard Marks et al., entitled "COMPUTER IMAGE AND AUDIO PROCESSING OF INTENSITY AND INPUT DEVICES FOR INTERFACING WITH A COMPUTER PROGRAM", filed the same day as the present application, the entire disclosures of which are incorporated herein by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity. In reality, however, the way in which users interact with a game has not changed dramatically over the years.

In view of the foregoing, there is a need for methods and systems that enable more advanced user interactivity with game play.

SUMMARY OF THE INVENTION

Broadly speaking, the present invention fills these needs by providing an apparatus and method that facilitates interactivity with a computer program. In one embodiment, the computer program is a game program, but without limitation, the apparatus and method can find applicability in any computer environment that may take in sound input to trigger control, input, or enable communication. More specifically, if sound is used to trigger control or input, the embodiments of the present invention will enable filtered input of particular sound sources, and the filtered input is configured to omit or focus away from sound sources that are not of interest. In the video game environment, depending on the sound source selected, the video game can respond with specific responses after processing the sound source of interest, without the distortion or noise of other sounds that may not be of interest. Commonly, a game playing environment will be exposed to many background noises, such as, music, other people, and the movement of objects. Once the sounds that are not of interest are substantially filtered out, the computer program can better respond to the sound of interest. The response can be in any form, such as a command, an initiation of action, a selection, a change in game status or state, the unlocking of features, etc.

In one embodiment, an apparatus for capturing image and sound during interactivity with a computer program is provided. The apparatus includes an image capture unit that is configured to capture one or more image frames. Also provided is a sound capture unit. The sound capture unit is configured to identify one or more sound sources. The sound capture unit generates data capable of being analyzed to determine a zone of focus at which to process sound to the substantial exclusion of sounds outside of the zone of focus. In this manner, sound that is captured and processed for the zone of focus is used for interactivity with the computer program.

In another embodiment, a method for selective sound source listening during interactivity with a computer program is disclosed. The method includes receiving input from one or more sound sources at two or more sound source capture microphones. Then, the method includes determining delay paths from each of the sound sources and identifying a direction for each of the received inputs of each of the one or more sound sources. The method then includes filtering out sound sources that are not in an identified direction of a zone of focus. The zone of focus is configured to supply the sound source for the interactivity with the computer program.

In yet another embodiment, a game system is provided. The game system includes an image-sound capture device that is configured to interface with a computing system that enables execution of an interactive computer game. The image-capture device includes video capture hardware that is capable of being positioned to capture video from a zone of focus. An array of microphones is provided for capturing sound from one or more sound sources. Each sound source is identified and associated with a direction relative to the image-sound capture device. The zone of focus associated with the video capture hardware is configured to be used to identify one of the sound sources at the direction that is in the proximity of the zone of focus.

In general, the interactive sound identification and tracking is applicable to the interfacing with any computer program of a any computing device. Once the sound source is identified, the content of the sound source can be further processed to trigger, drive, direct, or control features or objects rendered by a computer program.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is disclosed for methods and apparatus for facilitating the identification of specific sound sources and filtering out unwanted sound sources when sound is used as an interactive tool with a computer program.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

Figure 1:
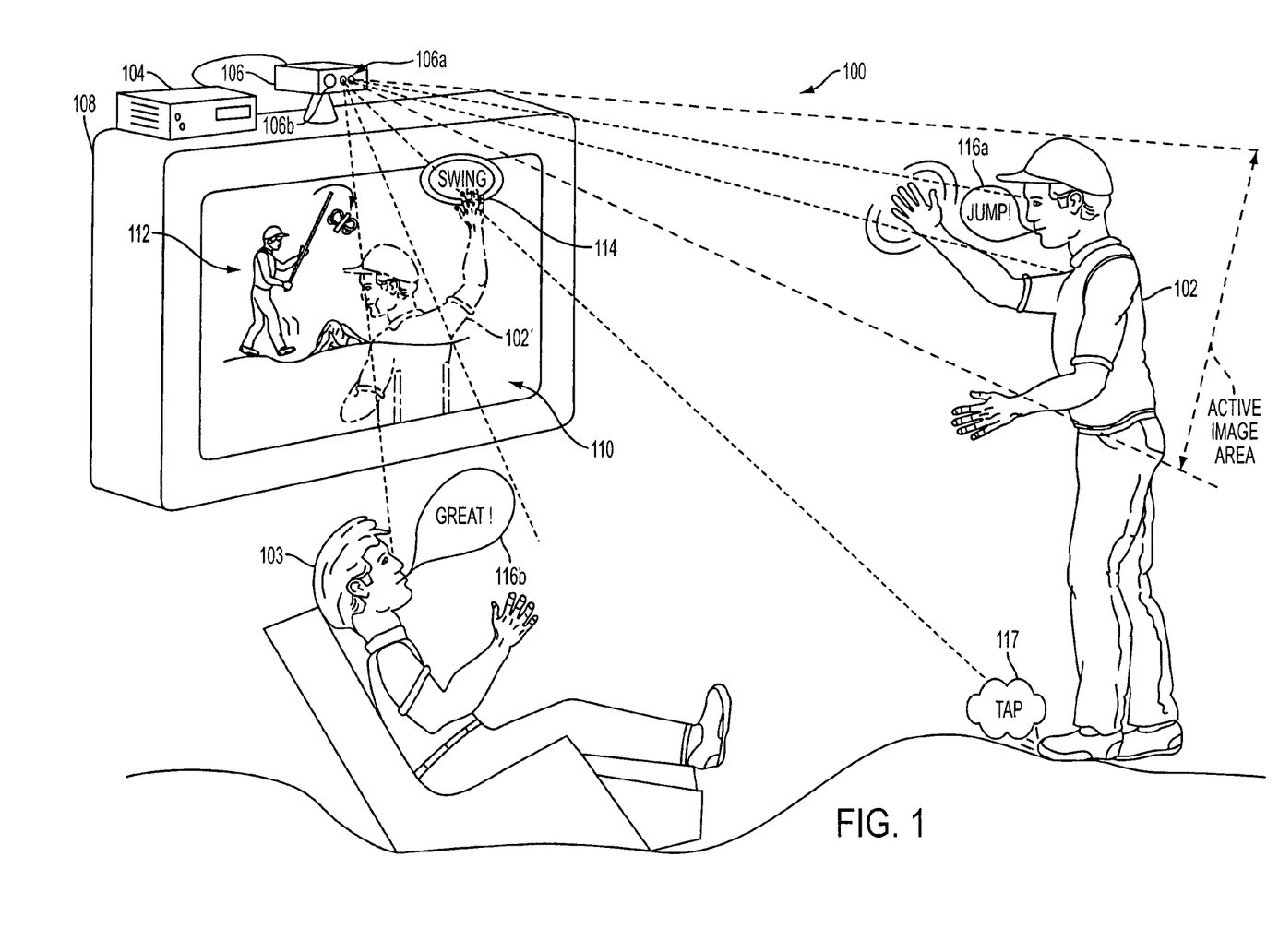
FIG. 1 shows a game environment in which a video game program may be executed for interactivity with one or more users, in accordance with one embodiment of the present invention.

FIG. 1 shows a game environment 100 in which a video game program may be executed for interactivity with one or more users, in accordance with one embodiment of the present invention. As illustrated, player 102 is shown in front of a monitor 108 that includes a display 110. The monitor 108 is interconnected with a computing system 104. The computing system can be a standard computer system, a game console or a portable computer system. In a specific example, but not limited to any brand, the game console can be a one manufactured by Sony Computer Entertainment Inc., Microsoft, or any other manufacturer.

Computing system 104 is shown interconnected with an image-sound capture device 106. The image-sound capture device 106 includes a sound capture unit 106a and an image capture unit 106b. The player 102 is shown interactively communicating with a game FIG. 112 on the display 110. The video game being executed is one in which input is at least partially provided by the player 102 by way of the image capture unit 106b, and the sound capture unit 106a. As illustrated, the player 102 may move his hand so as to select interactive icons 114 on the display 110. A translucent image of the player 102' is projected on the display 110 once captured by the image capture unit 106b. Thus, the player 102 knows where to move his hand in order to cause selection of icons or interfacing with the game FIG. 112. Techniques for capturing these movements and interactions can vary, but exemplary techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference.

In the example shown, the interactive icon 114 is an icon that would allow the player to select "swing" so that the game FIG. 112 will swing the object being handled. In addition, the player 102 may provide voice commands that can be captured by the sound capture unit 106a and then processed by the computing system 104 to provide interactivity with the video game being executed. As shown, the sound source 116a is a voice command to "jump!". The sound source 116a will then be captured by the sound capture unit 106a, and processed by the computing system 104 to then cause the game FIG. 112 to jump. Voice recognition may be used to enable the identification of the voice commands. Alternatively, the player 102 may be in communication with remote users connected to the internet or network, but who are also directly or partially involved in the interactivity of the game.

In accordance with one embodiment of the present invention, the sound capture unit 106a is configured to include at least two microphones which will enable the computing system 104 to select sound coming from particular directions. By enabling the computing system 104 to filter out directions which are not central to the game play (or the focus), distracting sounds in the game environment 100 will not interfere with or confuse the game execution when specific commands are being provided by the player 102. For example, the game player 102 may be tapping his feet and causing a tap noise which is a non-language sound 117. Such sound may be captured by the sound capture unit 106a, but then filtered out, as sound coming from the player's feet 102 is not in the zone of focus for the video game.

As will be described below, the zone of focus is preferably identified by the active image area that is the focus point of the image capture unit 106b. In an alternative manner, the zone of focus can be manually selected from a choice of zones presented to the user after an initialization stage. Continuing with the example of FIG. 1, a game observer 103 may be providing a sound source 116b which could be distracting to the processing by the computing system during the interactive game play. However, the game observer 103 is not in the active image area of the image capture unit 106b and thus, sounds coming from the direction of game observer 103 will be filtered out so that the computing system 104 will not erroneously confuse commands from the sound source 116b with the sound sources coming from the player 102, as sound source 116a.

Figure 2:
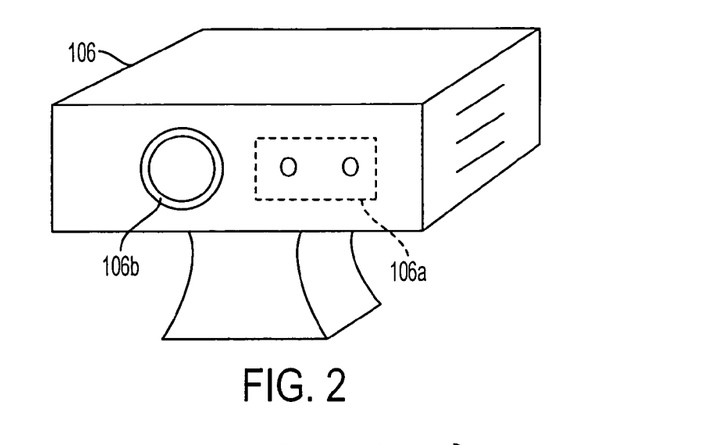
FIG. 2 illustrates a three-dimensional diagram of an example image-sound capture device, in accordance with one embodiment of the present invention.

The image-sound capture device 106 includes an image capture unit 106b, and the sound capture unit 106a. The image-sound capture device 106 is preferably capable of digitally capturing image frames and then transferring those image frames to the computing system 104 for further processing. An example of the image capture unit 106b is a web camera, which is commonly used when video images are desired to be captured and then transferred digitally to a computing device for subsequent storage or communication over a network, such as the internet. Other types of image capture devices may also work, whether analog or digital, so long as the image data is digitally processed to enable the identification and filtering. In one preferred embodiment, the digital processing to enable the filtering is done in software, after the input data is received. The sound capture unit 106a is shown including a pair of microphones (MIC1 and MIC2). The microphones are standard microphones, which can be integrated into the housing that makes up the image-sound capture device 106.

Figure 3A:
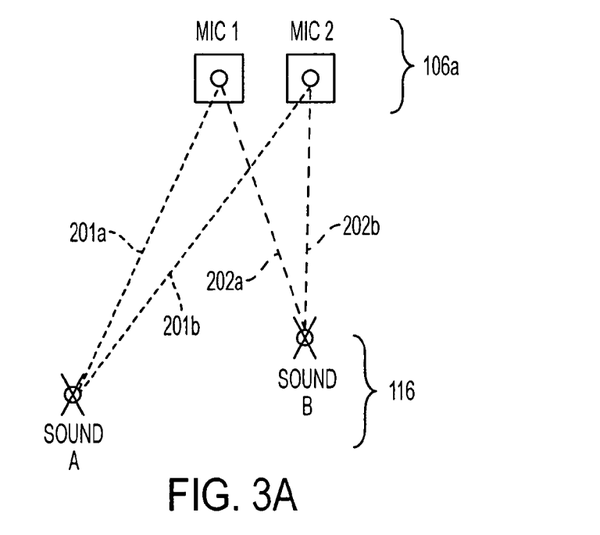
FIGS. 3A and 3B illustrate the processing of sound paths at different microphones that are designed to receive the input, and logic for outputting the selected sound source, in accordance with one embodiment of the present invention.

FIG. 3A illustrates sound capture units 106a when confronted with sound sources 116 from sound A and sound B. As shown, sound A will project its audible sound and will be detected by MIC1 and MIC2 along sound paths 201a and 201b. Sound B will be projected toward MIC1 and MIC2 over sound paths 202a and 202b. As illustrated, the sound paths for sound A will be of different lengths, thus providing for a relative delay when compared to sound paths 202a and 202b. The sound coming from each of sound A and sound B will then be processed using a standard triangulation algorithm so that direction selection can occur in box 216, shown in FIG. 3B. The sound coming from MIC1 and MIC2 will each be buffered in buffers 1 and 2 (210a, 210b), and passed through delay lines (212a, 212b). In one embodiment, the buffering and delay process will be controlled by software, although hardware can be custom designed to handle the operations as well. Based on the triangulation, direction selection 216 will trigger identification and selection of one of the sound sources 116.

Figure 3B:
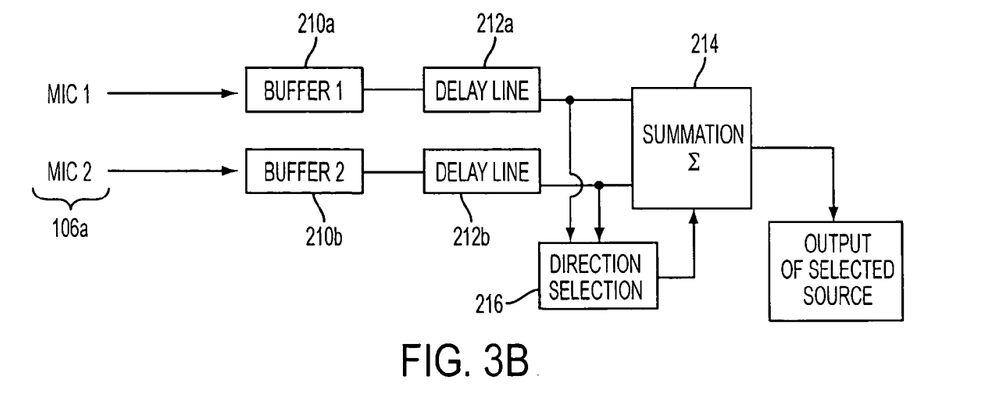

The sound coming from each of MICs1 and MICs2 will be summed in box 214 before being output as the output of the selected source. In this manner, sound coming from directions other than the direction in the active image area will be filtered out so that such sound sources do not distract processing by the computer system 104, or distract communication with other users that may be interactively playing a video game over a network, or the internet.

Figure 4:
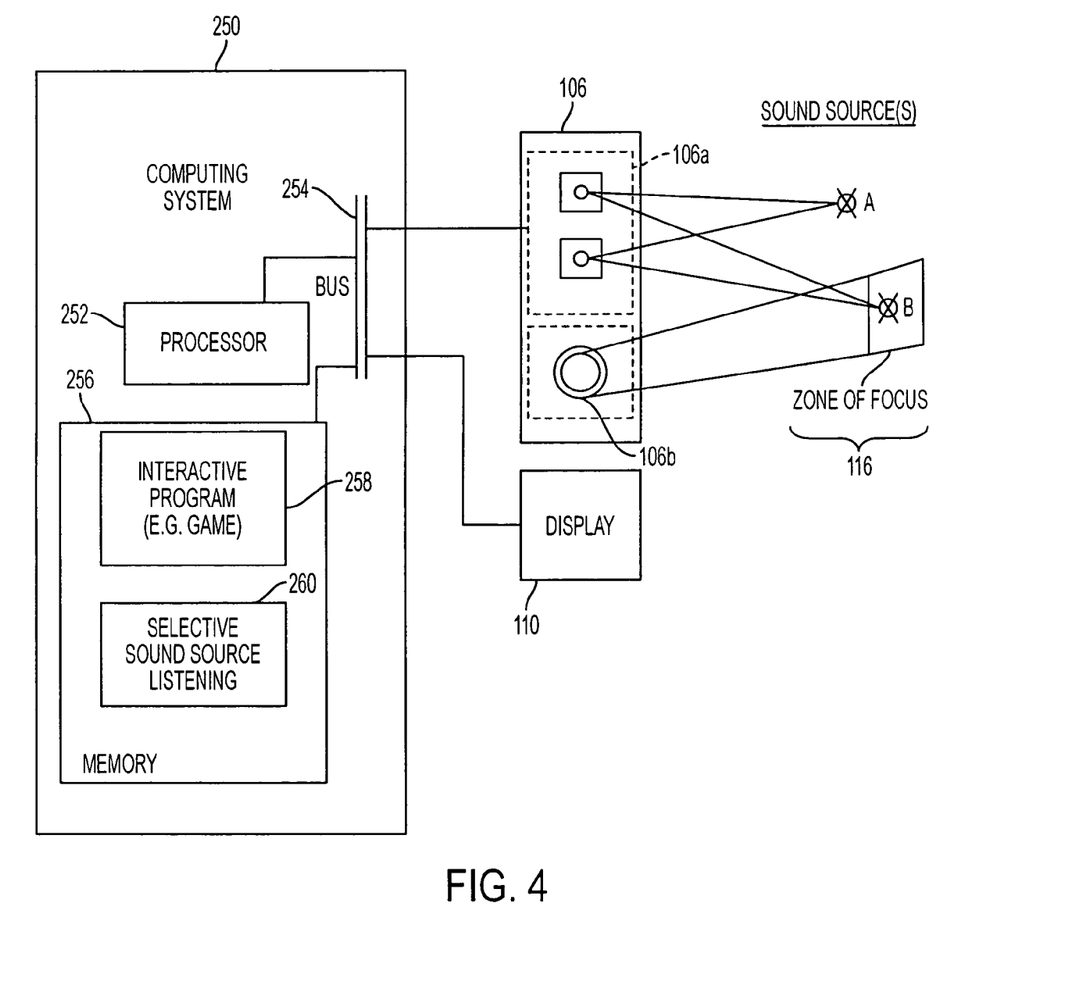
FIG. 4 illustrates an example computing system interfacing with an image-sound capture device for processing input sound sources, in accordance with one embodiment of the present invention.

FIG. 4 illustrates a computing system 250 that may be used in conjunction with the image-sound capture device 106, in accordance with one embodiment of the present invention. The computing system 250 includes a processor 252, and memory 256. A bus 254 will interconnect the processor and the memory 256 with the image-sound capture device 106. The memory 256 will include at least part of the interactive program 258, and also include selective sound source listening logic or code 260 for processing the received sound source data. Based on where the zone of focus is identified to be by the image capture unit 106b, sound sources outside of the zone of focus will be selectively filtered by the selective sound source listening logic 260 being executed (e.g., by the processor and stored at least partially in the memory 256). The computing system is shown in its most simplistic form, but emphasis is placed on the fact that any hardware configuration can be used, so long as the hardware can process the instructions to effect the processing of the incoming sound sources and thus enable the selective listening.

The computing system 250 is also shown interconnected with the display 110 by way of the bus. In this example, the zone of focus is identified by the image capture unit being focused toward the sound source B. Sound coming from other sound sources, such as sound source A will be substantially filtered out by the selective sound source listening logic 260 when the sound is captured by the sound capture unit 106a and transferred to the computing system 250.

In one specific example, a player can be participating in an internet or networked video game competition with another user where each user's primary audible experience will be by way of speakers. The speakers may be part of the computing system or may be part of the monitor 108. Suppose, therefore, that the local speakers are what is generating sound source A as shown in FIG. 4. In order not to feedback the sound coming out of the local speakers for sound source A to the competing user, the selective sound source listening logic 260 will filter out the sound of sound source A so that the competing user will not be provided with feedback of his or her own sound or voice. By supplying this filtering, it is possible to have interactive communication over a network while interfacing with a video game, while advantageously avoiding destructive feedback during the process.

Figure 5:
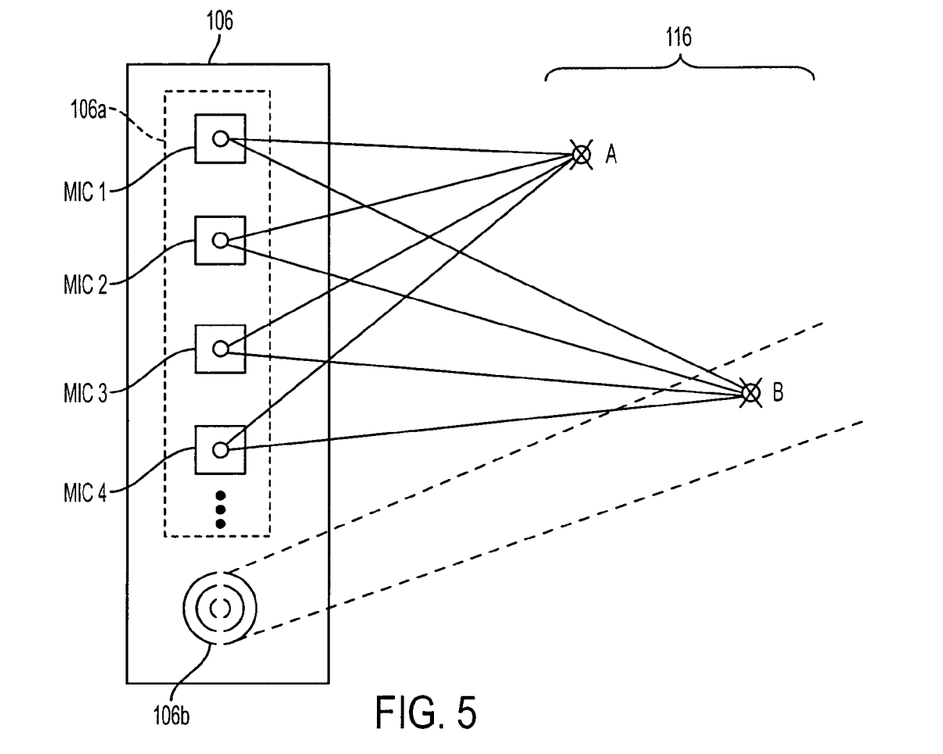
FIG. 5 illustrates an example where multiple microphones are used to increase the precision of the direction identification of particular sound sources, in accordance with one embodiment of the present invention.

FIG. 5 illustrates an example where the image-sound capture device 106 includes at least four microphones (MIC1 through MIC4). The sound capture unit 106a, is therefore capable of triangulation with better granularity to identify the location of sound sources 116 (A and B). That is, by providing an additional microphone, it is possible to more accurately define the location of the sound sources and thus, eliminate and filter out sound sources that are not of interest or can be destructive to game play or interactivity with a computing system. As illustrated in FIG. 5, sound source 116 (B) is the sound source of interest as identified by the video capture unit 106b. Continuing with example of FIG. 5, FIG. 6 identifies how sound source B is identified to a spatial volume.

Figure 6:
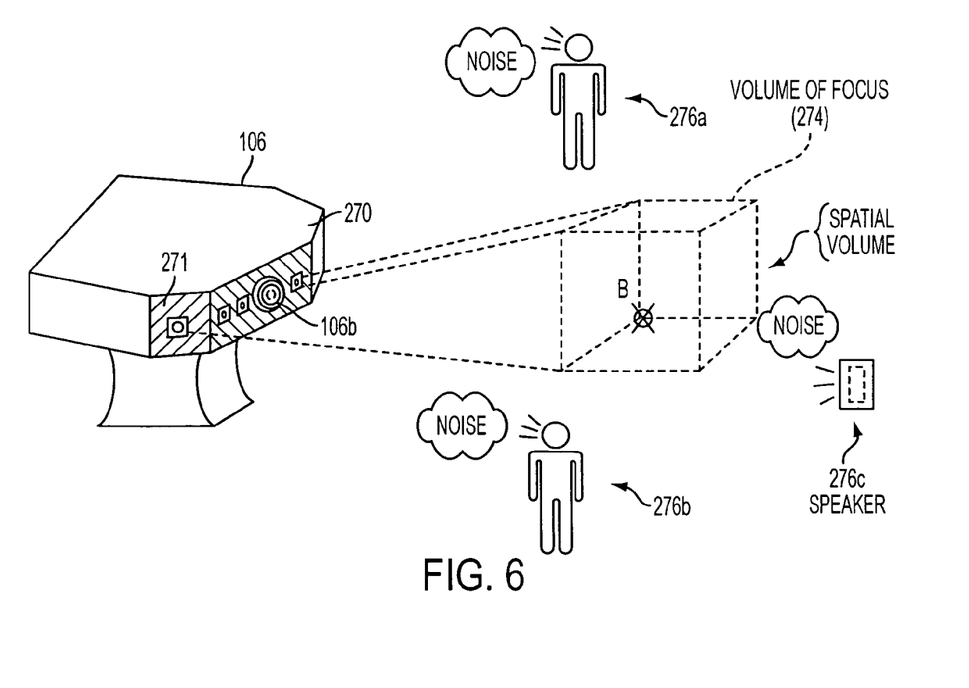
FIG. 6 illustrates an example in which sound is identified at a particular spatial volume using microphones in different planes, in accordance with one embodiment of the present invention.

The spatial volume at which sound source B is located will define the volume of focus 274. By identifying a volume of focus, it is possible to eliminate or filter out noises that are not within a specific volume (i.e., which are not just in a direction). To facilitate the selection of a volume of focus 274, the image-sound capture device 106 will preferably include at least four microphones. At least one of the microphones will be in a different plane than three of the microphones. By maintaining one of the microphones in plane 271 and the remainder of the four in plane 270 of the image-sound capture device 106, it is possible to define a spatial volume.

Consequently, noise coming from other people in the vicinity (shown as 276a and 276b) will be filtered out as they do not lie within the spatial volume defined in the volume focus 274. Additionally, noise that may be created just outside of the spatial volume, as shown by speaker 276c, will also be filtered out as it falls outside of the spatial volume.

Figure 7:
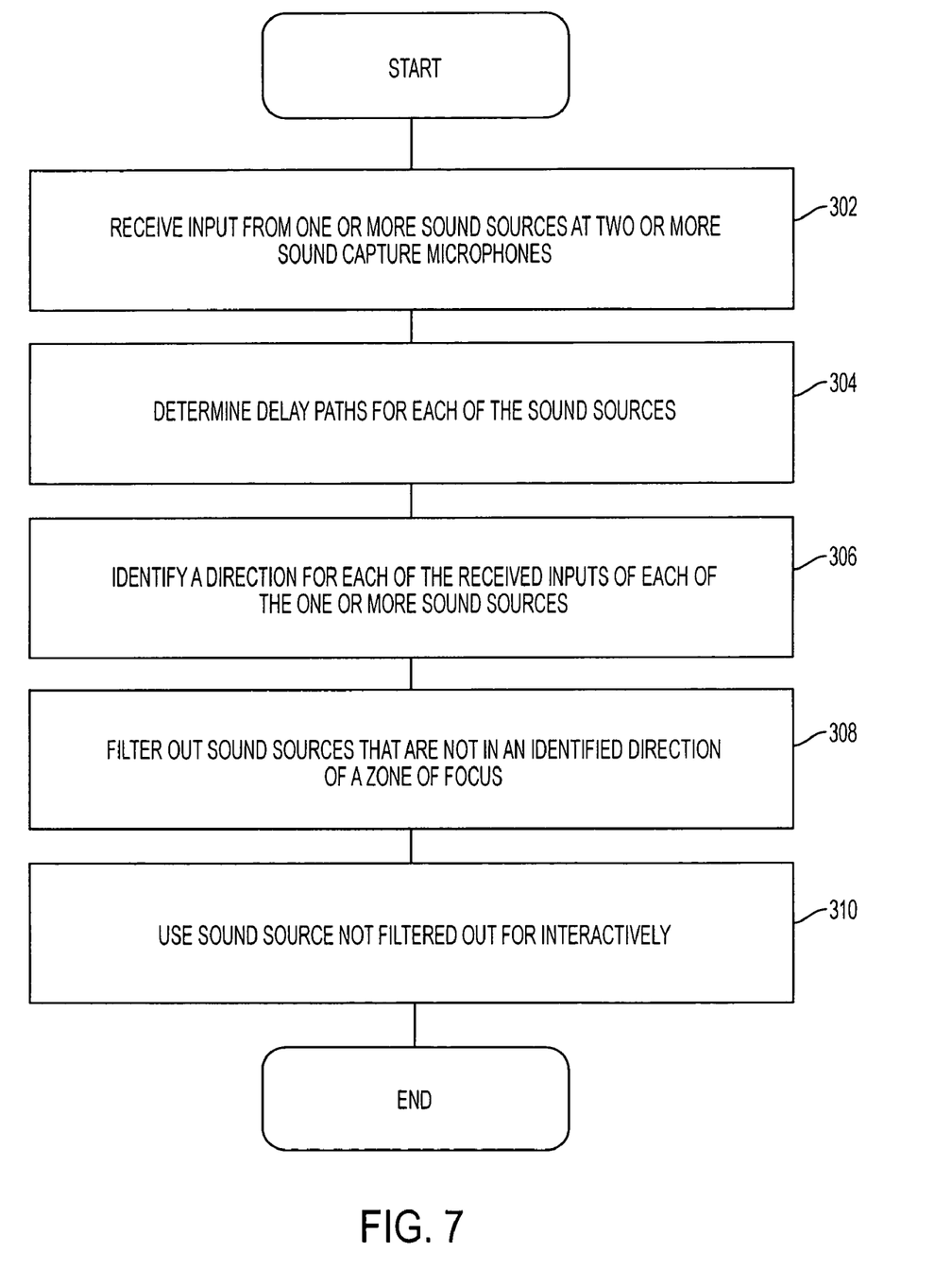
FIGS. 7 and 8 illustrates exemplary method operations that may be processed in the identification of sound sources and exclusion of non-focus sound sources, in accordance with one embodiment of the present invention.

FIG. 7 illustrates a flowchart diagram in accordance with one embodiment of the present invention. The method begins at operation 302 where input is received from one or more sound sources at two or more sound capture microphones. In one example, the two or more sound capture microphones are integrated into the image-sound capture device 106. Alternatively, the two or more sound capture microphones can be part of a second module/housing that interfaces with the image capture unit 106b. Alternatively, the sound capture unit 106a can include any number of sound capture microphones, and sound capture microphones can be placed in specific locations designed to capture sound from a user that may be interfacing with a computing system.

The method moves to operation 304 where a delay path for each of the sound sources is determined. Example delay paths are defined by the sound paths 201 and 202 of FIG. 3A. As is well known, the delay paths define the time it takes for sound waves to travel from the sound sources to the specific microphones that are situated to capture the sound. Based on the delay it takes sound to travel from the particular sound sources 116, the microphones can determine what the delay is and approximate location from which the sound is emanating from using a standard triangulation algorithm.

The method then continues to operation 306 where a direction for each of the received inputs of the one or more sound sources is identified. That is, the direction from which the sound is originating from the sound sources 116 is identified relative to the location of the image-sound capture device, including the sound capture unit 106a. Based on the identified directions, sound sources that are not in an identified direction of a zone (or volume) of focus are filtered out in operation 308. By filtering out the sound sources that are not originating from directions that are in the vicinity of the zone of focus, it is possible to use the sound source not filtered out for interactivity with a computer program, as shown in operation 310.

For instance, the interactive program can be a video game in which the user can interactively communicate with features of the video game, or players that may be opposing the primary player of the video game. The opposing player can either be local or located at a remote location and be in communication with the primary user over a network, such as the internet. In addition, the video game can also be played between a number of users in a group designed to interactively challenge each other's skills in a particular contest associated with the video game.

Figure 8:
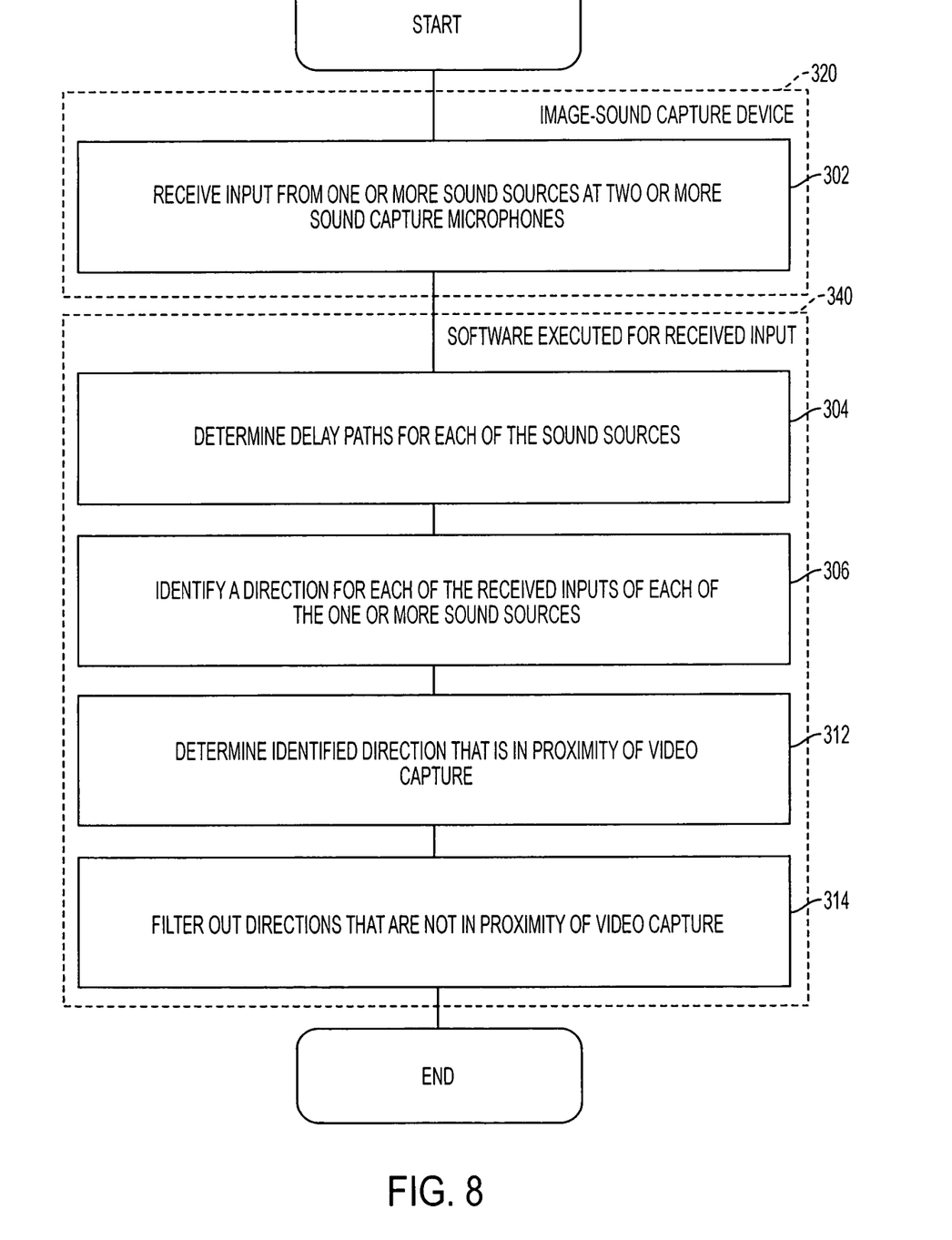

FIG. 8 illustrates a flowchart diagram in which image-sound capture device operations 320 are illustrated separate from the software executed operations that are performed on the received input in operations 340. Thus, once the input from the one or more sound sources at the two or more sound capture microphones is received in operation 302, the method proceeds to operation 304 where in software, the delay path for each of the sound sources is determined. Based on the delay paths, a direction for each of the received inputs is identified for each of the one or more sound sources in operation 306, as mentioned above.

At this point, the method moves to operation 312 where the identified direction that is in proximity of video capture is determined. For instance, video capture will be targeted at an active image area as shown in FIG. 1. Thus, the proximity of video capture would be within this active image area (or volume), and any direction associated with a sound source that is within this or in proximity to this, image-active area, will be determined. Based on this determination, the method proceeds to operation 314 where directions (or volumes) that are not in proximity of video capture are filtered out. Accordingly, distractions, noises and other extraneous input that could interfere in video game play of the primary player will be filtered out in the processing that is performed by the software executed during game play.

Consequently, the primary user can interact with the video game, interact with other users of the video game that are actively using the video game, or communicate with other users over the network that may be logged into or associated with transactions for the same video game that is of interest. Such video game communication, interactivity and control will thus be uninterrupted by extraneous noises and/or observers that are not intended to be interactively communicating or participating in a particular game or interactive program.

It should be appreciated that the embodiments described herein may also apply to on-line gaming applications. That is, the embodiments described above may occur at a server that sends a video signal to multiple users over a distributed network, such as the Internet, to enable players at remote noisy locations to communicate with each other. It should be further appreciated that the embodiments described herein may be implemented through either a hardware or a software implementation. That is, the functional descriptions discussed above may be synthesized to define a microchip having logic configured to perform the functional tasks for each of the modules associated with the noise cancellation scheme.

Also, the selective filtering of sound sources can have other applications, such as telephones. In phone use environments, there is usually a primary person (i.e., the caller) desiring to have a conversation with a third party (i.e., the callee). During that communication, however, there may be other people in the vicinity who are either talking or making noise. The phone, being targeted toward the primary user (by the direction of the receiver, for example) can make the sound coming from the primary user's mouth the zone of focus, and thus enable the selection for listening to only the primary user. This selective listening will therefore enable the substantial filtering out of voices or noises that are not associated with the primary person, and thus, the receiving party will be able to receive a more clear communication from the primary person using the phone.

Additional technologies may also include other electronic equipment that can benefit from taking in sound as an input for control or communication. For instance, a user can control settings in an automobile by voice commands, while avoiding other passengers from disrupting the commands. Other applications may include computer controls of applications, such as browsing applications, document preparation, or communications. By enabling this filtering, it is possible to more effectively issue voice or sound commands without interruption by surrounding sounds. As such, any electronic apparatus.

Further, the embodiments of the present invention have a wide array of applications, and the scope of the claims should be read to include any such application that can benefit from the such embodiments.

For instance, in a similar application, it may be possible to filter out sound sources using sound analysis. If sound analysis is used, it is possible to use as few as one microphone. The sound captured by the single microphone can be digitally analyzed (in software or hardware) to determine which voice or sound is of interest. In some environments, such as gaming, it may be possible for the primary user to record his or her voice once to train the system to identify the particular voice. In this manner, exclusion of other voices or sounds will be facilitated. Consequently, it would not be necessary to identify a direction, as filtering could be done based one sound tones and/or frequencies.

All of the advantages mentioned above with respect to sound filtering, when direction and volume are taken into account, are equally applicable.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An apparatus for capturing image and sound during interactivity with a computer game in a game environment, comprising:
   an image capture unit for capturing one or more image frames of the game environment, the captured one or more image frames being processed to identify an active image area, the active image area being defined by a location of a user during interactivity with the computer game, the active image area being continuously updated so as to track movement of the user; and
   a sound capture unit for capturing sound from the game environment, the sound capture unit identifying one or more sound sources, the sound capture unit generating data capable of being analyzed to determine a zone of focus at which to process sound to the substantial exclusion of sounds outside of the zone of focus, the excluded sounds being sounds which are not central to gameplay of the computer game, the zone of focus being substantially determined by the active image area, the zone of focus being updated as the active image area is updated so as to track interactive sounds produced by the user, wherein sound that is captured and processed for the zone of focus is used for interactivity with the computer game.

2. An apparatus for capturing image and sound during interactivity with a computer game as recited in claim 1, wherein the sound capture unit includes an array of microphones, the array of microphones for receiving sound from the one or more sound sources, the sounds of the one or more sound sources defining sound paths to each of the microphones.

3. An apparatus for capturing image and sound during interactivity with a computer game as recited in claim 2, wherein the sound paths include particular delays that enable calculation of direction of each of the one or more sound sources relative to the apparatus for capturing image and sound.

4. An apparatus for capturing image and sound during interactivity with a computer game as recited in claim 1, further comprising:
   a computing system for interfacing with the apparatus for capturing image and sound, the computing system including,
   a processor, and
   memory, the memory for storing at least part of the computer game and selective sound source listening code, the selective sound source listening code enabling the identification of which of the one or more sound sources identify as the zone of focus.

5. An apparatus for capturing image and sound during interactivity with a computer game as recited in claim 1, wherein the sound capture unit includes at least four microphones, and one of the four microphones is not in a same plane as the others.

6. An apparatus for capturing image and sound during interactivity with a computer game as recited in claim 5, wherein the four microphones define a spatial volume.

7. An apparatus for capturing image and sound during interactivity with a computer program as recited in claim 6, wherein the spatial volume is defined as a volume of focus for listening during interactivity with the computer game.

8. An apparatus for capturing image and sound during interactivity with a computer game as recited in claim 1, wherein the image capture unit is a camera and the sound capture unit is defined by an array of two or more microphones.

9. The apparatus of claim 1, wherein the image capture unit has an orientation defined by the active image area.

10. The apparatus of claim 9, wherein the orientation includes a focus point of the image capture unit defined by the active image area.

11. A method for selective sound source listening during interactivity with a computer game in a game environment, comprising:
    receiving input from one or more sound sources in the game environment at two or more sound source capture microphones;
    determining delay paths from each of the sound sources;
    identifying a direction for each of the received inputs of each of the one or more sound sources; and
    filtering out sound sources that are not in an identified direction of a zone of focus, the filtered out sound sources being sound sources which are not central to gameplay of the computer game, the zone of focus supplying the sound source for the interactivity with the computer game;
    wherein filtering receives processed input data after analysis by an image capture unit, the image capture unit producing image data to at least partially identify the zone of focus, the zone of focus being continuously updated so as to track the sound source for the interactivity with the computer game, and the image capture device being directionally positioned to receive image input for the computer game.

12. A method for selective sound source listening during interactivity with a computer game as recited in claim 11, wherein the computer game receives interactive input from both image data and sound data, the sound data being from the sound source of the zone of focus.

13. A method for selective sound source listening during interactivity with a computer game as recited in claim 11, wherein the two or more sound capture microphones include at least four microphones, and at least one of the four microphones is on a different plane than the others.

14. A method for selective sound source listening during interactivity with a computer game as recited in claim 13, wherein identifying the direction for each of the received inputs of each of the one or more sound sources includes processing a triangulation algorithm, the triangulation algorithm defining the direction that is relative to a location at which input is received from the one or more sound sources at the two or more sound source capture microphones.

15. A method for selective sound source listening during interactivity with a computer game as recited in claim 14, further comprising:
    buffering the received input from the one or more sound sources associated with the two or more sound source capture microphones; and
    delay processing the received buffered inputs;
    the filtering further including,
    selecting the one of the sound sources, the selected sound source output being a summation of sound from each of the sound source capture microphones.

16. The method of claim 11, wherein the image capture unit has an orientation defined by the zone of focus.

17. The method of claim 16, wherein the orientation includes a focus point of the image capture unit defined by the zone of focus.

18. A game system, comprising:
    an image-sound capture device, the image-sound capture device being configured to interface with a computing system that enables execution of an interactive computer game, the interactive computer game facilitating interactivity in a game environment, the image-capture device including,
        video capture hardware positioned to capture video from a zone of focus in the game environment, and
        an array of microphones for capturing sound from one or more sound sources in the game environment, each sound source being identified and associated with a direction relative to the image-sound capture device, the zone of focus associated with the video capture hardware is used to at least partially identify one of the sound sources at the direction that is in the proximity of the zone of focus, the zone of focus being updated so as to track the identified one of the sound sources.

19. A game system as recited in claim 18, wherein the video capture hardware receives video data to enable interactivity with features of the computer game.

20. A game system as recited in claim 18, wherein the sound source in the proximity of the zone of focus enables interactivity with the computer game or voice communication with other game users.

21. A game system as recited in claim 20, wherein sound sources outside of the zone of focus are filtered out of interactivity with the computer game, the filtered out sound sources being sound sources which are not central to gameplay of the computer game.

22. The game system of claim 18, wherein the video capture hardware has an orientation defined by the zone of focus.

23. The game system of claim 22, wherein the orientation includes a focus point of the video capture hardware defined by the zone of focus.

* * * * *